(12) United States Patent
Ross

(10) Patent No.: US 6,227,567 B1
(45) Date of Patent: May 8, 2001

(54) AIRBAG MODULE WITH GAS DISTRIBUTOR

(75) Inventor: Hubert Ross, Oberusel (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/349,698

(22) Filed: Jul. 8, 1999

(30) Foreign Application Priority Data

Aug. 28, 1998 (DE) .............................................. 198 39 283

(51) Int. Cl.⁷ .............................. B60R 21/28; B60R 21/26
(52) U.S. Cl. ........................... 280/742; 280/740; 280/737
(58) Field of Search .................................. 280/736, 737, 280/739, 740, 742

(56) References Cited

U.S. PATENT DOCUMENTS

| 3,905,515 | * | 9/1975 | Allemann | 280/737 |
| 5,433,476 | * | 7/1995 | Materna | 280/736 |
| 5,573,271 | * | 11/1996 | Headley | 280/736 |
| 5,707,078 |   | 1/1998 | Swanberg et al. | 280/739 |
| 5,788,275 | * | 8/1998 | Butt et al. | 280/737 |
| 5,938,235 | * | 8/1999 | Butt | 280/737 |

FOREIGN PATENT DOCUMENTS

| 4224927 | | 2/1994 | (DE) . |
| 19624044 | | 12/1997 | (DE) . |
| 19805308 | | 2/1998 | (DE) . |
| 19725418 | | 12/1998 | (DE) . |
| 814000 | | 6/1997 | (EP) . |
| 0982198 | * | 1/2000 | (EP) . |
| 2306409 | | 5/1997 | (GB) . |
| WO97/26160 | | 7/1997 | (WO) . |
| WO98/31570 | | 7/1998 | (WO) . |

* cited by examiner

Primary Examiner—Brian L. Johnson
Assistant Examiner—Matthew Luby
(74) Attorney, Agent, or Firm—Lonnie R. Drayer

(57) ABSTRACT

An airbag module has a gas distributor arranged between a gas generator and an airbag, in which at least a first and a second flow path for a gas are provided in the gas distributor. At least one valve device that opens and closes the respective flow path is arranged in each case in the flow paths. The first flow path connects the gas generator to the airbag, and the second flow path is not connected to the airbag.

9 Claims, 3 Drawing Sheets

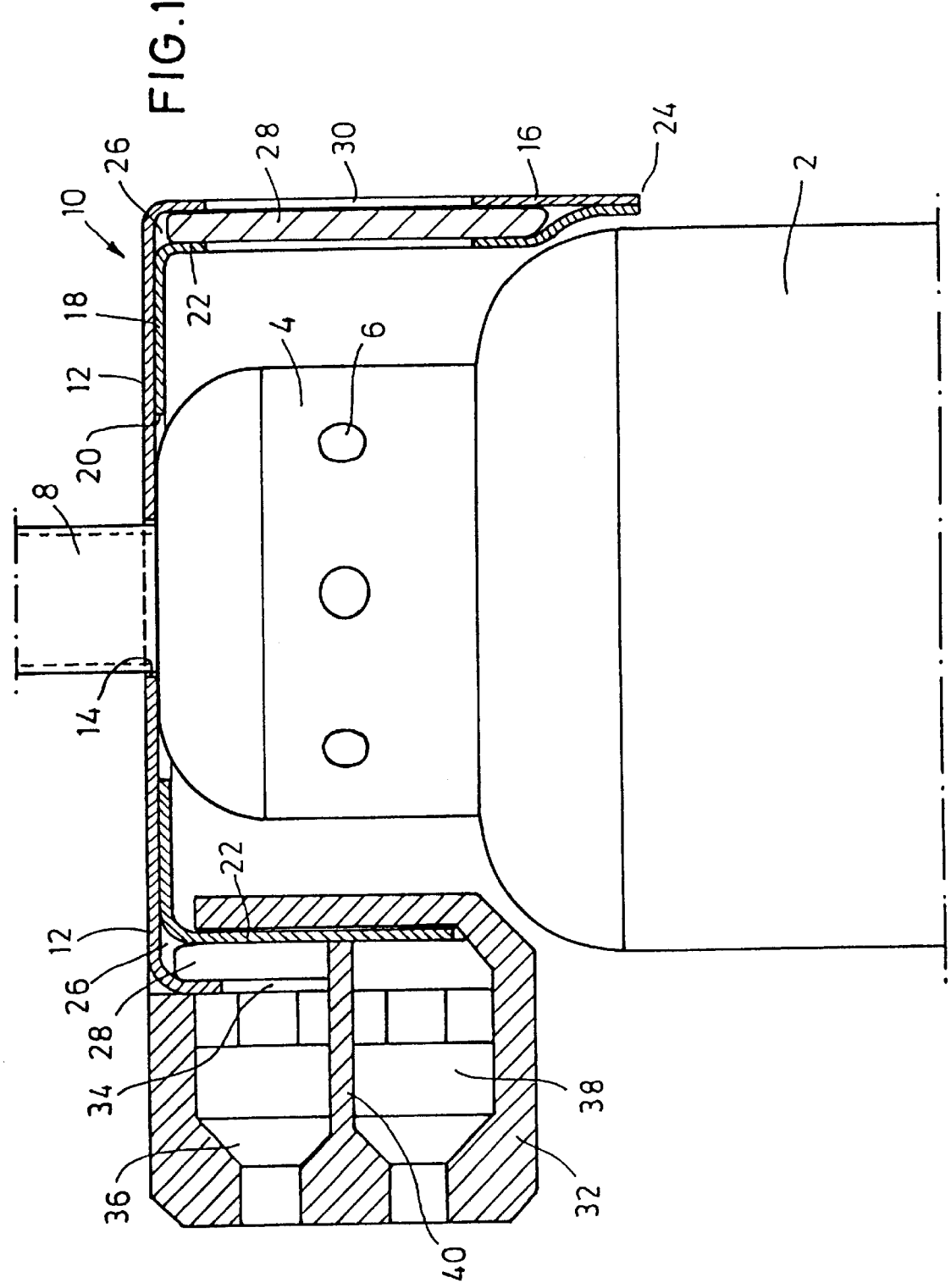

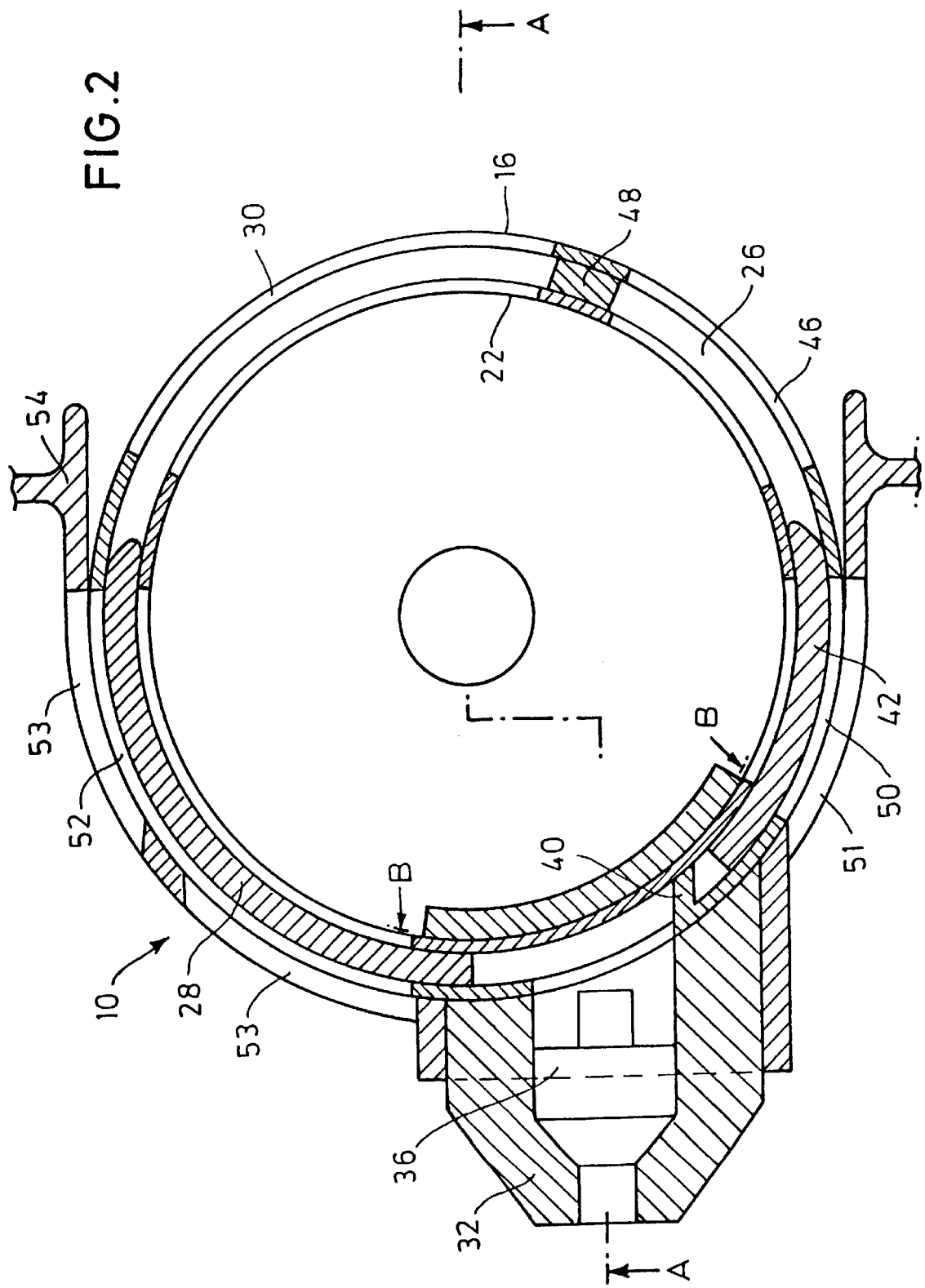

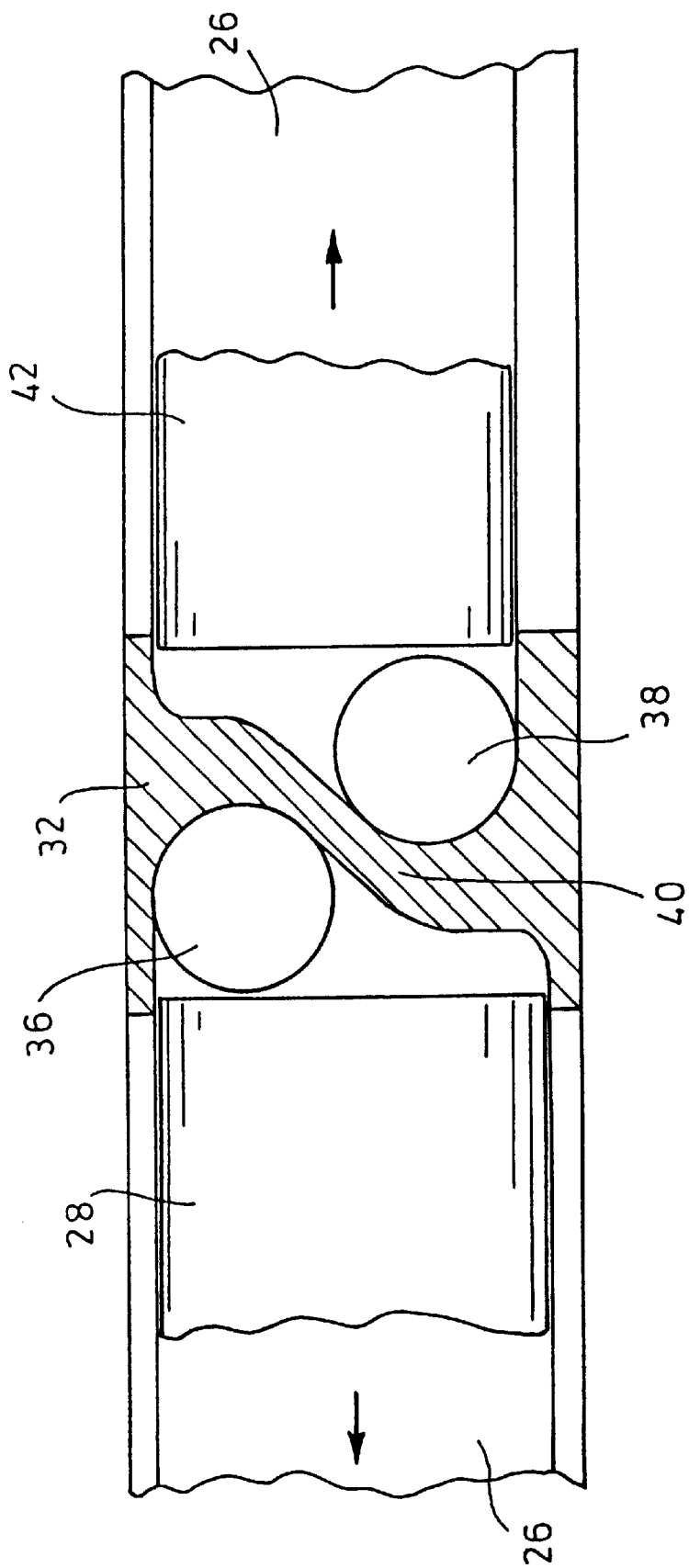

AIRBAG MODULE WITH GAS DISTRIBUTOR

FIELD OF THE INVENTION

The invention relates to an airbag module with a gas distributor.

BACKGROUND OF THE INVENTION

Intelligent restraining systems or airbag systems for motor vehicles using various sensors to determine whether a vehicle occupant is located directly in the space where the airbag is deployed have been under development for some time. When the airbag is deployed the quantity of gas flowing into the airbag will be reduced as much as possible, in order to avoid any injuries owing to the airbag. To date, multistage gas generators have been used predominantly to set the quantity of the gas flowing into the airbag. In these multistage gas generators, the total quantity of gas generant is subdivided into a plurality of units that are ignited either all at the same time or with a time offset, or of which only individual units are ignited. In the case of so-called hybrid gas generators, the ignition of only one stage ensures that the entire compressed gas already flows into the airbag. The ignition of a second, or further stages then leads only to a rise in temperature and thus a rise in pressure of the gas, but increases the volume of gas only insignificantly. However, the mass of gas exerts a substantial influence on the energy of the unfolding airbag, and is therefore also attended by a possible risk of injury to a vehicle occupant from the airbag.

The two-stage gas generators used to date are of very complicated construction, with the result that these gas generators also entail increased production costs. Furthermore, particularly in the case of the hybrid gas generators, it is difficult to reduce the volume of the gas flowing into the airbag, should this be desired.

Also known are airbag modules in which gas distribution devices are arranged on the gas generator. These gas distribution devices provide outflow openings that are sealed by means of flaps. These flaps can be opened if appropriate, with the result that some of the gas flows off not into the airbag, but into the environment through the outflow openings. The volume of the gas flowing into the airbag can therefore be reduced. However, such a gas distribution device permits only indirect, and thus imprecise, setting of the volume of gas flowing into the airbag. The mass of gas flowing into the airbag can be reduced by this device only to a specific value, a further reduction beyond this value being impossible.

It is the object of the invention to create an improved airbag module that has a gas distributor and permits a more precise setting of the mass of gas entering the airbag.

The object is achieved by means of an airbag module with a gas distributor that is arranged between a gas generator and an airbag.

In the airbag module according to the invention, a gas distributor is arranged between a gas generator and an airbag. The gas distributor has at least a first and a second flow path for a gas. At least one valve device for opening or closing the respective flow path is arranged in each case in the flow paths. In this case, the first flow path connects the gas generator to the airbag, while the second flow path is not connected to the airbag. Because of this arrangement, it is possible, by appropriately driving or setting the valve devices, for the gas generated by the gas generator to be introduced specifically into the airbag through the first flow path, or to be led off from the airbag through the second flow path. It is possible for a superfluous quantity of gas which is not required to fill the airbag or, because of a specific position of a vehicle occupant, is not desired to be led off via the second flow path so that it does not flow into the airbag. It is also possible to reduce the cross section of the first flow path by means of a valve device located therein, and thus to reduce the quantity and/or mass of the gas flowing into the airbag. When the valve device in the first flow path is completely closed, it is possible virtually entirely to prevent gas flowing into the airbag. Depending on the configuration of the valve device, it is then only a residual quantity of gas that flows into the airbag. As a rule, this residual quantity cannot be avoided, since no sealing means which could seal completely are provided on the valve devices used here. However, such a residual quantity of gas, for example 20% of the normal quantity which flows into the airbag, is insignificant, since it cannot fill the airbag to such an extent that the latter can pose a risk of injury to a vehicle occupant.

The second flow path advantageously connects the gas generator to at least one outflow opening. This outflow opening is advantageously arranged such that the outflowing gas flows away from the vehicle occupant. In the case of a driver's or passenger's airbag, such an outflow opening is therefore preferably positioned such that the gas flowing out through it is led off into the instrument panel of the motor vehicle. Thus, a superfluous quantity of gas, which is not required in a specific case to fill the airbag because the latter is not to be completely filled owing to a specific position of the vehicle occupant to be protected, can be safely disposed of without the risk of injury to the vehicle occupant from hot gas which is led off into the environment.

The valve devices are preferably coupled in such a way that the total flow cross section of the flow paths remains constant in each position of the valve devices. It can be ensured in this way that when one of the valve devices is being closed the total flow cross section through which the gas generated by the gas generator can flow off is not reduced to such an extent as to cause an impermissible increase in the gas pressure in the gas generator or the gas distributor. Given appropriate coupling of the valve devices, it can be ensured that when one valve device reduces the cross section of a flow path, the other valve device simultaneously enlarges the cross section of the other flow path by the same amount so that the total flow cross section remains essentially constant, and actuating the valve devices cannot lead to an increase in the internal pressure in the gas generator and in the gas distributor.

It is preferred to provide at least one explosive propellant charge for actuating the valve devices. Such a propellant charge comprises, for example, a detonating pill that, like the gas generator as well, can be ignited electrically by an appropriate control device. The propellant charge then abruptly generates a specific quantity of gas that, for example, can drive in the valve device a piston that actuates the latter to change the flow cross section in the appropriate flow path. The actuation of the valve devices by propellant charges has the advantage of permitting an exceptionally rapid actuation of the valve devices such as is required in the case of an airbag module whose airbag is deployed in a few milliseconds. In a way that is also preferred, the propellant charges actuate the valve devices in such a way that the latter virtually completely seal or completely open the appropriate flow path. Absolutely tight sealing of the flow paths is mostly not necessary, and so it is possible to do without expensive seals.

It is expedient to provide locking means for locking the valve devices in predetermined valve positions. These locking means permit the valve devices to be fixed in their end positions so that they cannot move back unintentionally, for example because of vibrations which are acting on the airbag module, something which could lead to re-release or resealing of the corresponding flow path, and thus to malfunctioning of the airbag module. The locking means are preferably constructed in the form of latching or clamping means which reliably retain the valve devices in the appropriate positions.

The valve devices of the first and the second flow paths advantageously have at least one common, movable slide, it being the case that the first flow path is open and the second flow path is closed in a first position of the slide, and the first flow path is closed and the second flow path is open in a second position of the slide. When the vehicle occupant is located too close to the airbag module, this embodiment renders it possible for the airbag to be inflated only slightly or virtually not at all by virtue of the fact that the first flow path, which connects the gas generator to the airbag, is closed. The fact that a common slide simultaneously opens the second flow path correspondingly renders it possible to ensure that the quantity of gas not required to fill the airbag is reliably directed through the second flow path, with the result that no undesired or impermissible overpressure can be produced in the gas generator or the gas distributor.

It is preferred for a propellant charge to be arranged in such a way that the slide can be moved from its first into its second position by igniting the propellant charge. When the propellant charge is ignited, a pressure is abruptly produced which abruptly moves the slide from its first position into the second. An extremely fast movement of the slide is thereby possible, with the result that the quantity of gas flowing into the airbag before the closure of the first flow path can be kept low.

The slide is preferably guided in a sliding fashion in a guiding device. In this way, a reliable and specific movement of the slide is rendered possible without jamming or tilting, with the result that malfunctioning of the valve devices can be prevented.

It is also preferred for the guiding device to have locking means for locking the slide in the region of the second position of the slide. The locking means retain the slide in the second position, in which the first flow path is closed, so that it cannot move back and inadvertently clear the first flow path again, something which would lead to undesired further filling of the airbag.

In a further embodiment, two first and two second flow passages and two slides are arranged, it being possible for the two slides to be moved, preferably independently of one another, in order in each case to close a first flow path and simultaneously to open a second flow path. This means that there are two flow paths connecting the gas generator to the airbag. Furthermore, corresponding to each of said first flow paths is a corresponding second flow path which, if appropriate, serves to direct a quantity of gas not required to inflate the airbag. Preferably, the two flow paths connecting the gas generator to the airbag can be sealed independently of one another by a separate slide in each case. This results in further possibilities for setting and/or controlling when filling the airbag. For example, the two first flow paths can be open so that the airbag is filled completely, but it is also possible for one or both of the first flow paths to be sealed so that the airbag is inflated only partially or virtually not at all. It is also preferred that in this case the two first flow paths can have different cross sections so that, depending on which of the two flow passages is sealed by a slide, it is possible to set a different inflation pressure strength for the airbag. At the same time, however, each slide opens the associated second flow path, thus ensuring that the quantity of gas which does not flow into the airbag through a first flow path is led off reliably through a corresponding second flow path. It is expedient for this purpose for the second flow path to have the same cross section as the first flow path to ensure that the quantity or volume of gas not required is directed completely away from the airbag and there is no impermissible increase in the internal pressure of the gas distributor or of the gas generator. The invention is not limited to the number of flow paths described here, rather it is also possible to arrange more flow paths, the flow paths advantageously being configured such that upon actuation of the valve devices the total flow cross section always remains essentially constant.

The slide is preferably arcuate and guided in an annular channel that is arranged concentrically with a gas outlet device of a gas generator. An exceptionally compact configuration of the gas distributor can be achieved in this way. Thus, the gas distributor can be arranged around a gas outlet device of a known gas generator without the need for additional modifications to the gas generator.

The flow paths are preferably constructed as openings that extend transverse to the direction of movement of the slide through the annular channel. The slide can thus move in the annular channel transverse to a flow direction of the gas flowing through the openings, and seal or clear the corresponding openings.

A detonator housing is connected to the annular channel for holding a propellant charge and is arranged on the annular channel behind the slide in the direction of movement. In this way, an appropriate propellant charge for moving the slide can be arranged directly on the annular channel, with the result that a shockwave produced upon ignition of the propellant charge enters the annular channel directly and accelerates or moves like a piston the slide guided there.

The second flow path can connect the gas generator to a further airbag. In this arrangement, the gas distributor can be used to inflate different airbags by one and the same gas generator, for example depending on the position of a vehicle occupant. The gas distributor switches over between appropriate flow paths that connect the gas generator to different airbags.

BRIEF DESCRIPTION OF THE DRAWINGS

Preferred embodiments of the invention are described below with the aid of attached drawings, in which:

FIG. 1 shows a section along a line A—A in FIG. 2, through a gas distributor according to the invention and arranged on a gas generator;

FIG. 2 shows a cross section through the gas distributor shown in FIG. 1; and

FIG. 3 shows a section along the line B—B in FIG. 2.

DETAILED DESCRIPTION OF THE INVENTION

FIG. 1 shows a section through a preferred embodiment of a gas distributor for the airbag module according to the invention. The gas generator 2 corresponds to a known tubular gas generator, and has at one longitudinal end a gas outlet device 4 with appropriate outlet openings 6. Projecting on the end face of the gas outlet device 4 of the gas generator 2 is a fastener 8, preferably in the form of a threaded bolt, which serves both to fasten the gas generator 2 to a support structure on the vehicle side, and to fasten the gas distributor 10 to the gas generator 2.

The gas distributor 10 comprises a first cup-shaped element 12 with a circular base face, which has in its bottom a passageway 14 through which the bolt 8 extends. An annular sidewall 16 extends essentially perpendicular to and starting from the bottom of the cup-shaped element 12. The cup-shaped element 12 is mounted on the bolt 8 and the gas generator 2 so that the sidewall 16 surrounds the gas outlet device 4. A second cup-shaped element 18 is arranged inside the first cup-shaped element 12. The bottom of the second cup-shaped element 18 rests against the inside of the bottom of the first cup-shaped element 12. In this arrangement the bottom of the second cup-shaped element 18 also has in its middle a hole 20 which is arranged concentrically with the passageway 14 in the first cup-shaped element 12, but is larger, with the result that the gas outlet device 4 bears with its end face against the bottom of the first cup-shaped element 12. The second cup-shaped element 18 is connected permanently to the first cup-shaped element 12, for example by welding. Thus, the two elements 12, 18 can be fastened permanently to the gas outlet device 4 of the gas generator 2 by means of a nut screwed onto the bolt 8.

The second cup-shaped element 18 has a smaller diameter than the first cup-shaped element 12, with the result that a space is formed between the sidewall 16 of the first cup-shaped element 12 and the sidewall 22 of the second element 18. The sidewalls 16, 22 extend in this case essentially parallel to one another from the bottoms of the cup-shaped elements 12, 18 to a free edge 24. Near the free edge 24, the sidewall 22 is shaped such that it approaches the sidewall 16 and is permanently connected, for example by welding, to the sidewall 16, preferably in the region of the free edge 24. This produces between the first cup-shaped element 12 and the second cup-shaped element 18 an annular channel 26 in which an appropriately bent slide 28 is movably arranged. Furthermore, openings 30 are provided in the gas distributor 10, that is to say in the sidewalls 16, 22. Provided both in the sidewall 16 and in the sidewall 22 for this purpose are openings which are situated opposite one another and thus form a continuous opening 30 which extends transverse to the annular channel 26. The slide 28 can move in the annular channel 26 such that it seals or clears the opening 30.

Two different positions of the slide 28 are shown on the right and left in FIG. 1. In FIG. 1, the slide 28 is located on the right in a position in which it seals the opening 30. By contrast, shown on the left in FIG. 1 is the initial position, described later, of the slide 28, in which the opening 30 is open (not shown in FIG. 1). The slide is advantageously also guided above and below the opening 30 between the sidewalls 22, 16.

A detonator housing 32 is arranged on the sidewalls 16, 22 on another side or at another point of the gas distributor 10. At this point, the detonator housing 32 embraces the two sidewalls with the annular channel 26 situated therebetween. In this case, the detonator housing 32 is preferably fastened to the first cup-shaped element 12 and/or the second cup-shaped element 18, for example by welding. At the point at which the detonator housing 32 embraces the sidewalls 16, 22, the outer sidewall, that is to say the sidewall 16 of the first cup-shaped element 12, has a cut-out 34 which connects the annular channel 26 to the interior of the detonator housing 32 which completely surrounds the cut-out 34. Constructed in the detonator housing 32 are two chambers 36, 38 that are situated opposite the cut-out 34 in the sidewall 16 and thus are connected to the annular channel 26. The two chambers 36, 38 are separated from one another by a wall 40. The wall 40 projects so far into the annular channel 26 that it comes into contact with the outside of the sidewall 22 of the second, that is to say inner, cup-shaped element, which is arranged inside the cup-shaped element 12. The result of this is that the annular channel 26 is divided at this point into two sections in the circumferential direction, each of the chambers 36, 38 being connected to one section each. It is possible to arrange in the chambers 36, 38 propellant charges or tablets which are connected through corresponding openings in the detonator housing 32 to an electric or electronic control device for igniting the tablets.

FIG. 2 shows a cross section through the gas distributor, shown in FIG. 1, of the airbag module according to the invention. Constructed between the sidewalls 16, 22 of the first and second cup-shaped elements 12, 18 is an annular channel 26 in which two slides 28, 42 are movably arranged. To be seen on the right-hand side in FIG. 2 are two passageways 30, 46 that extend through the sidewalls to form a first flow path for connection to an airbag. Arranged in the annular channel 26 between the two openings 30, 46 is a stop element 48 against which the slides 28, 42 strike when they seal the openings 46, 30. On the left in FIG. 2, the gas distributor 10 has two further passageways 50, 52 which, in turn, extend through the two sidewalls 16, 22. In the state shown in FIG. 2, that is to say the initial state, the slides 28, 42 are situated in the annular channel 26 in such a way that they seal the openings 50, 52. The openings 50, 52 are directed into the environment of the gas generator, preferably in the direction of the instrument panel in order to direct into the environment gas which is not used to inflate the airbag. The gas distributor 2 is additionally surrounded by an airbag housing 54 that extends around the side of the gas distributor 2 in which the openings 50, 52 are provided. In this case, the housing 54 has openings 51, 53 at the location of the openings 50, 52, with the result that the openings 50, 52 are connected to the environment without obstruction. Toward the other side, the housing 54 is open and constructed with connection or fastening of an airbag (not shown here).

The detonator housing 32 is fitted on the side of the gas distributor 10 on which the housing 54 extends. The detonator housing 32 embraces the sidewalls 16, 22 with the annular channel 26 situated therebetween. Only one of the chambers 36 for the propellant charge may be recognized in FIG. 2. As is to be seen, the detonator housing 36 is arranged on the sidewall 22 of the first cup-shaped element 12, which forms the outer wall of the gas distributor 10, in such a way that it comes to lie precisely over the cut-out 34. The chamber 36 is therefore connected to the annular channel 26. The partition 40 extends into the annular channel 26 in such a way that it comes to bear against the outside of the sidewall 22 and therefore divides the annular channel 26 into two regions in the circumferential direction starting from the position of the detonator housing 32. The chamber 36 shown here is connected to the region of the annular channel 26 in which the slide 28 is located. When a propellant charge in the chamber 36 is ignited and, on this basis, the internal pressure in this chamber rises, this pressure is introduced into the annular channel 26 and acts on the rear end face of the slide 28. A force therefore acts on the slide 28 and moves the latter into a second position, in which it seals the opening 30. In this state, the slide 28 strikes against the stop element 48, with the result that it cannot move out beyond the position sealing the opening 30. At the same time, the opening 52 previously sealed by the slide 28 is opened, with the result that instead of flowing through the opening 30 into the airbag, the gas flows through the opening 52 into the environment. In this case, the opening 52 and the opening 30 have approximately the same cross section and so there is no change in the total flow cross section owing to the movement of the slide 28. A rise in pressure in the gas distributor 10 can be prevented in this way.

It is also advantageous to arrange a locking device (not shown here) in the region of the opening 30 so that the slide 28 cannot move back into its initial position from the opening 30 so that the opening 30 would be cleared again and the opening 52 sealed again. Such a locking device can be constructed, for example, as a clamping device in such a form that the two sidewalls 16, 22 approach one another in the direction of movement of the slide 28 to the stop element 48, that is to say the annular channel narrows in this direction, so that the slide 28 is jammed between the sidewalls 16, 22.

The chamber 38 (not shown in FIG. 2) of the detonator housing 32 is connected to the part of the annular channel 26 in which the slide 42 lies, with the result that upon ignition of a propellant charge arranged in the chamber 38 the slide 42 is moved into the region of the opening 46 until it comes to bear against the stop 48. In this position, the slide 42 seals the opening 46, while at the same time the previously sealed opening 50 is open. Gas introduced by the gas generator 2 into the gas distributor 10 through the gas outlet device 4 does not now flow through the opening 46 into an airbag, but is directed through the opening 50, which is now open, into the environment, that is to say advantageously into the instrument panel. In this case, the opening 50 is approximately the same size as the opening 46, with the result that the total flow cross section is essentially constant irrespective of the position of the slide 42. It is thus possible at any point in time to achieve complete outflow of the gas from the gas generator. Consequently, there can be no dangerous rise in the internal pressure in the gas generator 2 and the gas distributor 10 on the basis of a change in the position of the slide 42.

A locking device such as the previously described clamping device can be provided here, as well. In addition to this locking possibility, there is also the possibility of providing latching elements by means of which the slides are latched.

A very flexible control of the inflation volume of an airbag with gas can be achieved by the arrangement of two slides 28, 42 and two differently sized pairs of openings 30, 52 and 46, 50. Depending on the position adopted by a vehicle occupant in relation to the airbag to be inflated or to another external parameter, either both openings 30, 46 can be opened for inflating the airbag, or only the opening 30 or the opening 46 can be opened, depending on which quantity or volume of gas is to be introduced into the airbag. If the airbag is not to be inflated at all, the two openings 30, 46 can be closed by the slides 28, 42, with the result that virtually no gas flows into the airbag. In this case, the gas not flowing into the airbag is directed into the environment via the openings 50, 52 that are then respectively automatically opened. In this case, the slides 28, 42 can be moved independently of one another on the basis of the two propellant charges, which are provided in the chambers 36, 38 and can be ignited independently of one another.

FIG. 3 shows a section along the line B—B, which illustrates the arrangement of the two chambers 38, 36 in the detonator housing 32. To permit as compact as possible a configuration of the gas distributor, in particular in the direction of the height, it is not desirable to arrange the chambers 36, 38 completely one above another, for which reason the chambers are arranged slightly offset relative to one another and are separated from one another by the snaking partition 40. The chambers 36, 38 are essentially circular, but widen toward the annular channel 26. It is therefore possible for a pressure produced in the chambers 36, 38 to act on the whole end face of the respective piston 28, 42. In the initial position, the pistons 28, 42 bear directly against the chambers 36, 38 in the region of the detonator housing 32. Upon ignition of a propellant charge in one of the chambers, the piston connected to the respective chamber is moved from this initial position into the previously described second position.

The gas distributor 10 shown here, that is to say the cup-shaped elements 12, 16, are constructed in this case as deep-drawn, sheet metal parts. However, this part can also be fabricated as a casting made from metal, or any suitable material such as plastic. The detonator housing 32 is preferably fabricated from steel and placed against the elements 12, 16 and connected to the latter by means of an interference fit or any other suitable fastening means such as welding. Even if the detonator housing is represented as one piece in part of these simplified representations, it is still also possible for this housing to be constructed in several parts for reasons of production engineering. This housing can preferably be produced from steel, but also from other metals such as, for example, aluminum or as a plastic component.

Accordingly, the scope of the present invention is defined and limited only by the following claims.

What is claimed is:

1. An airbag module comprising (a) a gas distributor arranged between a gas generator and an airbag;

(b) first and a second gas flow paths are provided in the gas distributor, the first flow path extending between the gas generator and the airbag, and the second flow path does not extend to the airbag; and (c) a valve device arranged in each flow path for opening or closing the respective flow path, the valve devices for the flow paths are coupled in such a way that the total cross section of the flow paths remains constant in each position of the valve devices, wherein the valve device comprises a movable slide free from apertures, which opens and closes the valve device.

2. The airbag module as claimed in claim 1 in which the second flow path connects the gas generator to an outflow opening.

3. The airbag module as claimed in claim 1 in which at least one explosive propellant charge is provided for actuating the valve devices.

4. The airbag module as claimed in claim 1 in which the first flow path is open and the second flow path is closed in a first position of the movable slide, and the first flow path is closed and the second flow path is open in a second position of the movable slide.

5. The airbag module as claimed in claim 4 in which a propellant charge is arranged in such a way that the slide can be moved from its first into its second position by detonating the propellant charge.

6. The airbag module as claimed in claim 5 in which the slide is guided in a sliding fashion in a guiding device.

7. The airbag module as claimed in claims 6 in which the slide is arcuate and guided in an annular channel that is arranged concentrically with a gas outlet device of a gas generator.

8. The airbag module as claimed in claim 7 in which the flow paths are constructed as openings that extend transverse to the direction of movement of the slide through the annular channel.

9. The airbag module as claimed in claim 7 in which at least one detonator housing connected to the annular channel, for holding at least one propellant charge is arranged on the annular channel behind the slide in the direction of movement.

* * * * *